United States Patent
Van Evans et al.

(10) Patent No.: US 6,669,471 B2
(45) Date of Patent: Dec. 30, 2003

(54) FURNACE CONVEYER BELT HAVING THERMAL BARRIER

(75) Inventors: Timothy Van Evans, Ypsilanti, MI (US); Jeffrey Scott Southwood, Ann Arbor, MI (US); Thomas Mark Hudson, II, Rochester Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 61 days.

(21) Appl. No.: 10/145,306

(22) Filed: May 13, 2002

(65) Prior Publication Data

US 2003/0211439 A1 Nov. 13, 2003

(51) Int. Cl.⁷ .................................................. F27B 9/24

(52) U.S. Cl. ...................... 432/121; 432/230; 432/239

(58) Field of Search ................................ 432/121, 239, 432/230; 198/830, 831, 832, 834, 835, 844.1, 846, 850; 428/472, 699, 701, 702, 633

(56) References Cited

U.S. PATENT DOCUMENTS

| | | | | |
|---|---|---|---|---|
| 4,273,824 A | * | 6/1981 | McComas et al. | 442/7 |
| RE33,876 E | * | 4/1992 | Goward et al. | 428/633 |
| 5,320,909 A | * | 6/1994 | Scharman et al. | 428/472 |
| 5,843,585 A | | 12/1998 | Alperine et al. | |
| 5,855,477 A | | 1/1999 | Tanino | |
| 6,025,078 A | * | 2/2000 | Rickerby et al. | 428/469 |

OTHER PUBLICATIONS

"Applied Coatings, Inc.", http://www.appliedcoatings.net/, Jan. 7, 2002, pp. 1–3.

Scrivani, et al., "A Comparative Study on HVOF, Vacuum Plasma Spray and Air Plasma Spray for CoNiCrAlY alloy disposition", ITSC Manuscript Instructions, http://www.unifi.it/unifi/surfchem/solid/tbcs/bardi/mcraly/CoNiCrAlYart12jun01.html, Jan. 7, 2002, pp. 1–7.

"On the Suitability and Application of MCrAlY Coatings Under Various Operating Conditions", National Thermal Spray Conference, Sep. 1995, Sermatech International Incorporated, http://www.srematech.com/rsrc_p03.html, Jan. 7, 2002.

"Nickel Based MCrAlY Powders", Praxair Surface Technologies, http://www.praxairsurfacetechnologies.com/PXT_Web/products/powders/ZNFPowdersMCrAl..., Jan. 7, 2002, pp. 1–2.

(List continued on next page.)

Primary Examiner—Jiping Lu
(74) Attorney, Agent, or Firm—Brinks Hofer Gilson & Lione

(57) ABSTRACT

A brazing furnace includes a housing defining an interior environment having an inlet and an outlet, a plurality of heating elements mounted within the housing and adapted to heat the interior environment to an elevated temperature, and a conveyor belt extending through the housing and supported on a plurality of driven rollers whereby an object placed upon the conveyor belt at the inlet is transported through the inlet into the interior environment and out through the outlet. The conveyor belt includes a plurality of interconnected metal links and a thermal barrier coating applied to the metal links, thereby insulating the metal links and restricting the amount of thermal energy that is absorbed by the conveyor belt as the conveyor belt moves through the interior environment.

21 Claims, 3 Drawing Sheets

OTHER PUBLICATIONS

"High-energy synchrotron radiation for the analysis of stresses in the bond layer of a thermal barrier coating system", ID15A highlight 1998, http://www.esrf.fr/exp_facilities/ID15B/science/highlight98/Stress.html, Jan. 7, 2002, pp. 1–3.

"Cool Software for Hot Materials", http://www.sti.nasa.gov/tto/spinoff2000/ipl.htm, Jan. 7, 2002, pp. 1–2.

Turbine Resources Unlimited, Industrial Coating capabilities, http://www.calltru.com/services/coatings.html, Jan. 7, 2002, pp. 1–2.

Subramanian, et al., "Advanced Thermal Barrier Coating Systems For The ATS Engine", Siemens Westinghouse Power Corporation, pp. 1–14.

Hermanek, Praxair Surface Technologies, "Thermal Barrier Coatings", pp. 1–3, Aug. 12, 1999.

Scrivani, et al, "Removal Of Zirconia Thermal Barrier Coatings And MCrAlY Bond Coatings From Turbine Blades: A Comparison Of Methods Based On Chemical Stripping, Water Jet And Salt Bath", http://www.unifi.it/unifi/surfchem/solid/bardi/tbcs/tbcstripping.tbcstripping.html, Jan. 7, 2002, pp. 1–8.

Dorfman, et al., "Thermal Barrier Coatings: Improving Thermal Protection", Sulzer Technical Review Apr. 2001, pp. 10–13.

Gell, et al. "Bond Strength and Stress Measurements in Thermal Barrier Coatings—1997 Status", Department of Metallurgy and Materials Engineering, University of Connecticut, Department of Mechanical Engineering, University of Connecticut, pp. 1–19.

* cited by examiner

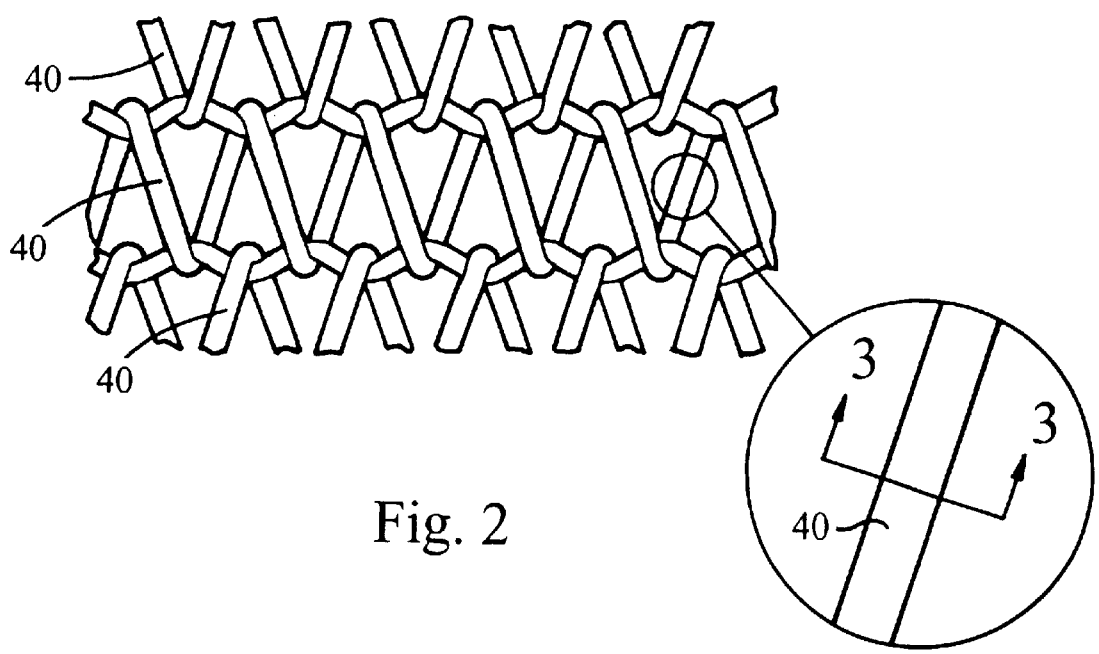
Fig. 2
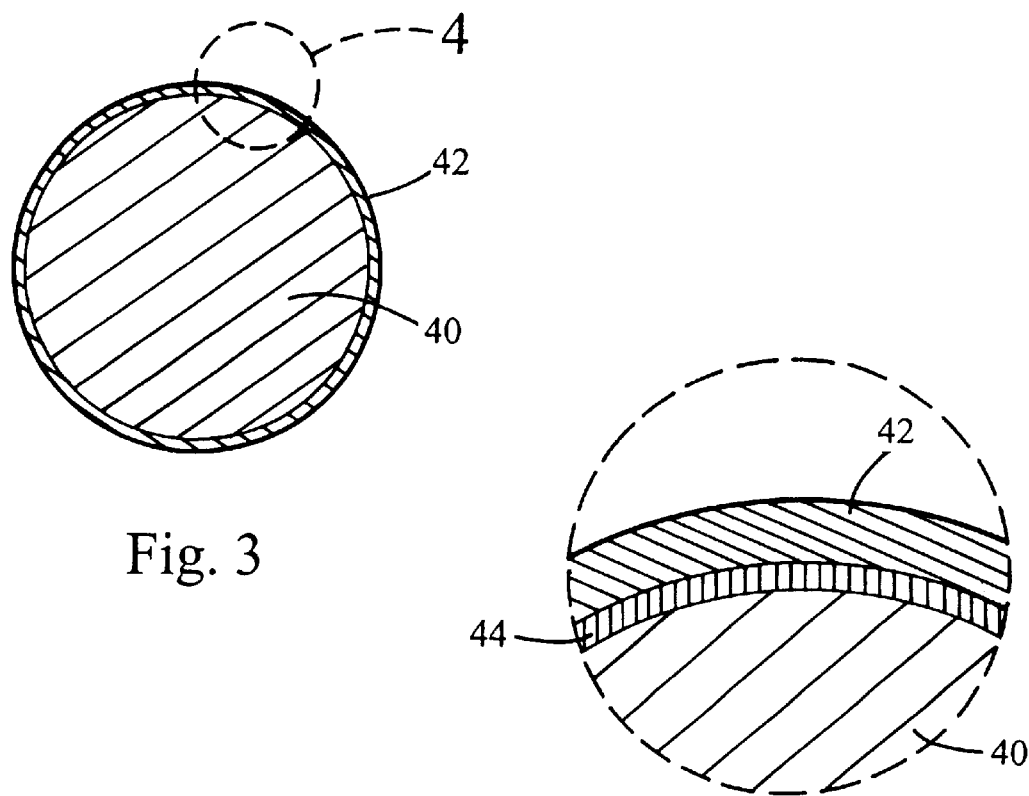
Fig. 3
Fig. 4

Fig. 5

| Thermal Conductivity (BTU/hr-ft-°F) | | |
|---|---|---|
| Temperature (°F) | Bond Coat (MCrAlY) | Thermal Barrier Coating (ZrO₂) |
| 750 | 3.0 | 0.566 |
| 1465 | 4.0 | 0.601 |
| 2010 | 5.0 | 0.624 |
| 2550 | 5.5 | 0.774 |

Fig. 6

| Process | Bonding Agent | Bonding Agent Thickness | Thermal Barrier Coating | Thermal Barrier Coating Thickness | Stabilizer |
|---|---|---|---|---|---|
| Plasma Spraying | MCrAlY | 0.002" - 0.007" | Zirconia Oxide | 0.0005" - 0.002" | Cr₂O₃, HfO₂, TiO₂ MgO, CeO₂, Y₂O₃ |
| Wire Arc Spray | MCrAlY | 0.002" - 0.007" | Zirconia Oxide | 0.003" - 0.5" | MgO, CeO₂, Y₂O₃ |
| Flame Spray | MCrAlY | 0.002" - 0.007" | Zirconia Oxide | 0.005" minimum | MgO, CeO₂, Y₂O₃ |

FURNACE CONVEYER BELT HAVING THERMAL BARRIER

TECHNICAL FIELD

The present invention generally relates to a conveyor belt for a high temperature furnace. More specifically, the present invention relates to a conveyor belt that is coated with a thermal barrier to reduce the amount of thermal energy absorbed by the conveyor belt.

BACKGROUND

In a typical CAB brazing furnace, a metal conveyor belt is typically used to transport the parts being brazed through the furnace. Many different types of metallic conveyor belts exist and are typically made up of links that are interconnected thereby forming a flexible mesh configuration. The conveyor belt extends around and is supported on a plurality of rollers, at least one of which is driven by some type of motor. The driven roller engages the conveyor belt to move the conveyor belt over the rollers. Since the interior of the brazing furnace is extremely hot, the metal conveyor belt is heated up along with the parts riding on it, as the conveyor belt move through the interior of the furnace. At the end of the furnace, the conveyor belt extends beyond the heated interior to bring the parts out of the furnace for unloading. The conveyor belt then travels around the rollers, under the furnace, and back to the front end of the furnace.

When a particular section of the conveyor belt leaves the interior of the furnace, the conveyor belt cools down, thereby transferring the thermal energy that was absorbed within the furnace to the atmosphere. This is wasted energy. Additionally, when the conveyor belt is heated and cooled, the conveyor belt experiences cyclic thermal expansion and contraction. The repetitive expansion and contraction of the conveyor belt causes the conveyor belt to fatigue and results in pre-mature catastrophic failure of the conveyor belt.

For the reasons stated above, there is a need for a conveyor belt having a thermal coating to reduce the amount of thermal energy absorbed by the conveyor belt as the conveyor belt travels through a high temperature furnace.

BRIEF DESCRIPTION OF THE DRAWINGS

FIG. 2 is a top view of a portion of a conveyor belt of the present invention;

FIG. 3 is a sectional view taken along line 3—3 of FIG. 2;

FIG. 4 is an enlarged view of a portion of FIG. 3;

FIG. 5 is a table showing the thermal conductivity of the preferred embodiment; and FIG. 6 is a table summarizing the resultant thicknesses and preferred stabilizers for the preferred embodiment.

DETAILED DESCRIPTION OF THE PREFERRED EMBODIMENTS

Figure 1:
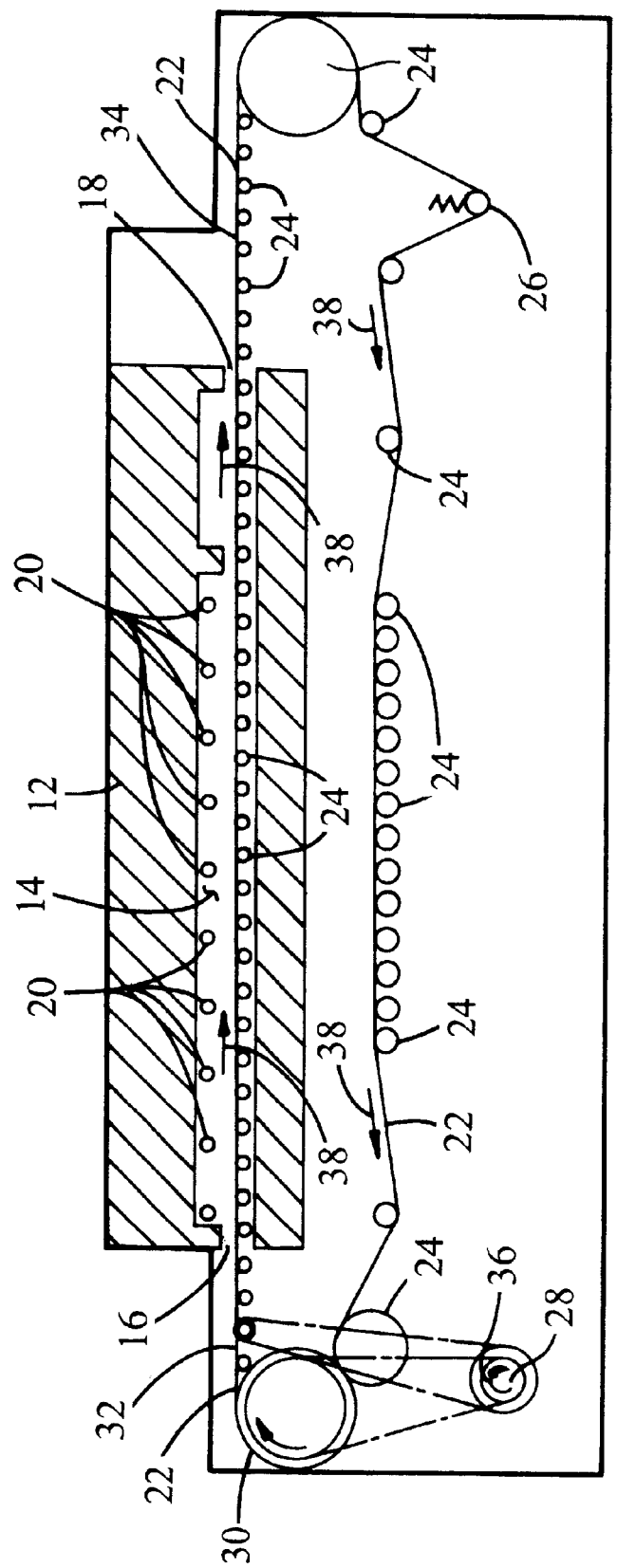
FIG. 1 is a side sectional view of a brazing furnace of the present invention.

The following description of the preferred embodiment of the invention is not intended to limit the scope of the invention to this preferred embodiment, but rather to enable any person skilled in the art to make and use the invention.

Referring to FIG. 1, a brazing furnace of the present invention is shown generally at 10. The brazing furnace 10 includes a housing 12 which defines an interior environment 14. An inlet 16 is positioned at one end of the furnace 10 and an outlet 18 is positioned at an end of the furnace 10 opposite the inlet 16. Within the interior environment 14, the housing 12 includes a plurality of heating elements 20. The heating elements 20 are adapted to provide heat to bring the interior environment 14 up to the high temperatures required to perform the brazing process.

A conveyor belt 22 is adapted to carry parts through the furnace 10. The conveyor belt 22 extends through the inlet 16, across the interior environment, and through the outlet 18. The conveyor belt 22 is supported on a plurality of rollers 24. Preferably, the conveyor belt 22 is continuous, and extends about the plurality of rollers 24 wherein at least one of the rollers 24 acts as a tensioner 26 to keep the conveyor belt 22 stretched tightly over the rollers 24. The conveyor belt 22 must be tight enough to prevent slack from forming which could cause the conveyor belt 22 to bind up, but must also be loose enough to allow smooth movement over and around the rollers 24.

At lease one of the rollers 24 is driven by a motor 28 or some other drive device. A driven roller 30 will engage the conveyor belt 22 to pull the conveyor belt around the plurality of rollers 24. Preferably, the overall length of the conveyor belt 22 is slightly longer than the housing 12, whereby a loading area 32 is provided outside the housing adjacent the inlet 16 and an unloading area 34 is provided outside the housing adjacent the outlet 18. When in operation, the motor 28 rotates as shown by the arrow 36, thereby causing the conveyor belt to travel around the plurality of rollers and through the interior environment as shown by the arrows 38. As the conveyor belt 22 moves, parts are loaded onto the conveyor belt 22 at the loading area 32 and are transported through the inlet into the interior environment. When the parts reach the opposite end of the interior environment 14, they are transported through the outlet 18 to the unloading area 34.

Preferably, the conveyor belt 22 is made up of a plurality of interconnected metal links 40 as shown in FIG. 2. It is to be understood, that any type of metal flexible conveyor belt will satisfy the requirements of the present invention, and the style shown in FIG. 2 is merely given as an example. Referring to FIG. 3, a thermal barrier coating 42 is applied to the metal links 40, thereby insulating the metal links 40 and reducing the amount of thermal energy that can be absorbed by the conveyor belt 22 as the conveyor belt 22 moves through the heated interior environment 14.

Preferably, the thermal barrier coating 42 is made from a ceramic such as zirconia oxide having the chemical formula $ZrO_2$. Zirconia oxide works well because it has a high melting temperature of approximately 2700° C., and low thermal conductivity. It is to be understood that other know ceramics could be used with substantially similar results. Pure zirconia oxide will, however, go through a phase transformation when heated, therefore a stabilizer is preferably added to the zirconia oxide. The stabilizer is an oxide, the presence of which will prevent zirconia oxide from going through a phase transformation during heating. Preferably, the stabilizer is an oxide selected from the group consisting of $MgO$, $CeO_2$, $Y_2O_3$, $Cr_2O_3$, $HfO_2$, and $TiO_2$. It is to be understood that other known stabilizers for zirconia oxide could be used with substantially similar results.

Referring to FIG. 4, a bonding agent 44 is preferably positioned between the thermal barrier coating 42 and the metal links 40. The bonding agent 44 is applied to the metal links 40 prior to the thermal barrier coating 42 and provides a coating to allow the thermal barrier coating 42 to establish a metallic bond to the metal links 40. Preferably, the bonding agent 44 has the chemical formula MCrAlY, wherein Cr is chromium, Al is aluminum, Y is yttrium, and M is a metal. Preferbly, M is nickel, cobalt, or iron, however M could also be other acceptable metals known in the industry. It is to be understood, that the bonding agent 44 could comprise other suitable elements which are oxidation resistant. Other known high temperature coatings which could be used include: alpha-alumina, tantalum, molybdenum, aluminide, chromide, and other materials what are metallurgically bonded to substrates.

Referring to FIG. 5, a table is generally shown at 46 that illustrates the thermal conductivities of the bonding agent 44 and the thermal barrier coating 42 at various temperatures. The data within the table was compiled using MCrAlY as the bonding agent 44 and zirconia oxide as the thermal coating barrier 42. The temperatures were measured in degrees Fahrenheit, and the thermal conductivity is measured as BTU's/hr.-ft.-° F.

There are at least three known methods by which the bonding agent 44 and the thermal barrier coating 42 can be applied to the metal links 40. These are physical vapor deposition, chemical vapor deposition, and thermal spray, which are well known in the art. Preferably, the bonding agent 44 and the thermal barrier coating 42 of the present invention are applied to the metal links 40 by a thermal spray process. Variations of the thermal spray process include plasma spraying, wire arc spray, and flame spray.

Preferably, the thickness of the bonding agent 44 is between approximately 0.002 inches and approximately 0.007 inches. If the bonding agent 44 is being applied by plasma spraying, then the optimal thickness is about 0.004 inches. The thickness of the thermal barrier coating 42 depends upon the process used to apply it. If the thermal barrier coating 42 is applied by plasma spraying, then the thickness will be between approximately 0.0005 inches and approximately 0.002 inches. If the thermal barrier coating 42 is applied by a wire arc spray, then the thickness will be between approximately 0.003 inches and approximately 0.5 inches. Finally, if the thermal barrier coating 42 is applied by flame spray, the thickness will be at lease 0.005 inches thick.

Different stabilizers work better with different application processes, and different application processes result in different thicknesses of the bonding agent 44 and the thermal barrier coating 42. A table shown generally at 48 in FIG. 6 summarizes the preferred application processes, the stabilizers which work best with the application process, and the resultant thicknesses of the bonding agent 44 and the thermal barrier coating 42.

The foregoing discussion discloses and describes the preferred embodiments. One skilled in the art will readily recognize from such discussion, and from the accompanying drawings and claims, that changes and modifications can be made to the preferred embodiments without departing from the true spirit and fair scope of the inventive concepts as defined in the following claims. The preferred embodiments have been described in an illustrative manner, and it is to be understood that the terminology which has been used is intended to be in the nature of words of description rather than of limitation.

What is claimed is:

1. A conveyor belt for a high temperature furnace comprising;
   a conveyor belt having a plurality of interconnected metal links; and
   a thermal barrier coating applied to said metal links, thereby insulating said metal links and reducing the amount of thermal energy that is absorbed by said conveyor belt;
   said thermal barrier coating on said metal links being in frictional contact with said thermal barrier coating on adjacent metal links and adapted to withstand frictional contact between adjacent pairs of said metal links and to provide resistance to frictional contact with articles on said conveyor belt while maintaining insulating properties of said thermal barrier coating.

2. The conveyor belt of claim 1 further including a bonding agent disposed between said metal links and said thermal barrier coating to establish a metallic bond between said metal links and said thermal barrier coating.

3. The conveyor belt of claim 2 wherein said bonding agent has the chemical formula MCrAlY, wherein Cr is Chromium, Al is aluminum, Y is Yttrium, and M is a metal.

4. The conveyor belt of claim 3 wherein M is selected from the group consisting of Nickel, Cobalt, and Iron.

5. The conveyor belt of claim 2 wherein the thickness of said bonding agent is between approximately 0.002 inches and approximately 0.007 inches.

6. The conveyor belt of claim 5 wherein the thickness of said bonding agent is approximately 0.004 inches.

7. The conveyor belt of claim 2 wherein said thermal barrier coating comprises a ceramic.

8. The conveyor belt of claim 7 wherein said thermal barrier coating comprises Zirconium Oxide.

9. The conveyor belt of claim 8 wherein said thermal barrier coating also comprises a stabilizer to prevent phase transformation of the Zirconium Oxide during heating and cooling.

10. The conveyor belt of claim 9 wherein said stabilizer is an oxide selected from the group consisting of MgO, $CeO_2$, $Y_2O_3$, $Cr_2O_3$, $HfO_2$, and $TiO_2$.

11. A brazing furnace comprising:
    a housing defining an interior environment having an inlet and an outlet;
    a plurality of heating elements mounted within said housing and adapted to heat said interior environment to an elevated temperature;
    a conveyor belt extending through said housing and supported on a plurality of driven rollers whereby an object placed upon said conveyor belt at said inlet is transported through said inlet into said interior environment and out through said outlet;
    a thermal barrier coating applied to said conveyor belt to insulate said conveyor belt and reduce the amount of thermal energy absorbed by said conveyor belt and to provide resistance to frictional contact with articles on said conveyor belt while maintaining insulating qualities of said thermal barrier coating.

12. The brazing furnace of claim 11 wherein said conveyor belt includes a plurality of interconnected metal links and said thermal barrier coating is applied to said metal links, thereby insulating said metal links and reducing the amount of thermal energy that is absorbed by said conveyor belt as said conveyor belt moves through said interior environment, said thermal barrier coating on said metal links being in frictional contact with said thermal barrier coating of adjacent metal links and adapted to withstand frictional contact between adjacent pairs of said metal links.

13. The brazing furnace of claim 12 wherein said conveyor belt further includes a bonding agent disposed between said metal links and said thermal barrier coating to establish a metallic bond between said metal links and said thermal barrier coating.

14. The brazing furnace of claim 13 wherein said bonding agent has the chemical formula MCrAlY, wherein Cr is Chromium, Al is aluminum, Y is Yttrium, and M is a metal.

15. The brazing furnace of claim 14 wherein M is selected from the group consisting of Nickel, Cobalt, and Iron.

16. The brazing furnace of claim 15 wherein the thickness of said bonding agent is between approximately 0.002 inches and approximately 0.007 inches.

17. The brazing furnace of claim 16 wherein the thickness of said bonding agent is approximately 0.004 inches.

18. The brazing furnace of claim 13 wherein said thermal barrier coating comprises a ceramic.

19. The brazing furnace of claim 18 wherein said thermal barrier coating comprises Zirconium Oxide.

20. The brazing furnace of claim 19 wherein said thermal barrier coating includes a stabilizer to prevent phase transformation of the Zirconium Oxide during heating and cooling.

21. The brazing furnace of claim 20 wherein said stabilizer is an oxide selected from the group consisting of MgO, $CeO_2$, $Y_2O_3$, $Cr_2O_3$, $HfO_2$, and $TiO_2$.

* * * * *

UNITED STATES PATENT AND TRADEMARK OFFICE
CERTIFICATE OF CORRECTION

PATENT NO. : 6,669,471 B2
DATED : December 30, 2003
INVENTOR(S) : Timothy Van Evans et al.

It is certified that error appears in the above-identified patent and that said Letters Patent is hereby corrected as shown below:

<u>Title page, Item [54] and Column 1, line 1,</u>
Title, delete "CONVEYER" and substitute -- CONVEYOR -- in its place.

<u>Title page,</u>
Item [56], delete "/tbcs/bardi/" and substitute -- /bardi/tbcs/ -- in its place.
Item [57], ABSTRACT,
Line 4, delete "tbcstripping." and substitute -- tbcstripping/ -- in its place.

Signed and Sealed this

Sixth Day of April, 2004

JON W. DUDAS
*Acting Director of the United States Patent and Trademark Office*